(12) United States Patent
Kamiyama et al.

(10) Patent No.: US 8,662,211 B2
(45) Date of Patent: Mar. 4, 2014

(54) OMNIDIRECTIONAL VEHICLE

(71) Applicant: Honda Motor Co., Ltd., Tokyo (JP)

(72) Inventors: Nozomi Kamiyama, Saitama (JP);
Yusuke Mutoh, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/678,818

(22) Filed: Nov. 16, 2012

(65) Prior Publication Data

US 2013/0133959 A1    May 30, 2013

(30) Foreign Application Priority Data

Nov. 26, 2011  (JP) ................................. 2011-258365
May 14, 2012  (JP) ................................. 2012-110937

(51) Int. Cl.
*B62D 11/02*   (2006.01)
*B62H 7/00*    (2006.01)

(52) U.S. Cl.
USPC .............. 180/6.2; 180/7.1; 180/10; 180/21; 180/20; 280/293; 301/5.1; 301/5.23

(58) Field of Classification Search
USPC .................. 180/6.2, 7.1, 10, 21, 20; 280/293; 301/5.1, 5.23
See application file for complete search history.

(56) References Cited

U.S. PATENT DOCUMENTS

| | | | | |
|---|---|---|---|---|
| 4,413,693 A * | 11/1983 | Derby | ........................... | 180/343 |
| 4,715,460 A * | 12/1987 | Smith | ........................... | 180/7.1 |
| 8,162,092 B2 * | 4/2012 | Takenaka et al. | .............. | 180/222 |
| 8,240,407 B2 | 8/2012 | Takenaka et al. | | |
| 2010/0096905 A1 | 4/2010 | Takenaka et al. | | |
| 2010/0139996 A1* | 6/2010 | Takenaka et al. | ................ | 180/20 |
| 2011/0067938 A1* | 3/2011 | Gomi et al. | ..................... | 180/21 |
| 2011/0067939 A1* | 3/2011 | Takenaka | ........................ | 180/21 |
| 2011/0067940 A1* | 3/2011 | Takenaka | ....................... | 180/218 |

FOREIGN PATENT DOCUMENTS

| | | | |
|---|---|---|---|
| TW | 201024114 A | 7/2010 | |
| WO | 2008/132779 A1 | 11/2008 | |
| WO | 2008/139740 A1 | 11/2008 | |

* cited by examiner

*Primary Examiner* — James Kramer
*Assistant Examiner* — Marlon Arce
(74) *Attorney, Agent, or Firm* — Carrier Blackman & Associates, P.C.; Joseph P. Carrier; William D. Blackman

(57) ABSTRACT

An omnidirectional vehicle 1 includes: a main wheel 3 which is able to be driven in all directions; a base 2 which supports the main wheel 3; and a sub wheel 4 which is connected to the base 2 via an arm 15 and is grounded at a position apart from the ground contact point of the main wheel 3. The sub wheel 4 is attached so as to circularly move about the center of rotation of the main wheel 3.

4 Claims, 5 Drawing Sheets

OMNIDIRECTIONAL VEHICLE

BACKGROUND OF THE INVENTION

1. Field of the Invention

The present invention relates to an omnidirectional vehicle.

2. Description of the Related Art

International Publication No. WO 2008/132779 discloses an omnidirectional moving apparatus, in which a main wheel is arranged between rotating members to which a plurality of free rollers are concentrically attached and the main wheel is adapted to be movable in all directions by driving the main wheel using a lateral force of the free rollers, and an omnidirectional vehicle using the omnidirectional moving apparatus.

In addition, International Publication No. WO 2008/139740 discloses an omnidirectional vehicle (a conveyance) having sub wheels (auxiliary wheels) each of which is able to contact with the ground at a position apart from the ground contact point of a main wheel (traveling drive wheel) which is able to be driven in all directions so as to be able to turn in a small turning radius. The sub wheel is rotatably attached to the rear end of an arm which is pivotally supported by a bracket attached to the rear surface of the vehicle body.

The sub wheel is, for example, an omni-wheel able to be driven by an electric motor. In this case, the vehicle is able to be rotated with the ground contact point of the main wheel as the center. Furthermore, it is possible to select a grounded state or an ungrounded state of the sub wheel whether the arm is flipped up by manipulation of a handlebar.

In the omnidirectional vehicle disclosed in International Publication No. WO 2008/139740, however, the traction of the sub wheel becomes unstable particularly when the vehicle body largely inclines in the anteroposterior direction. Furthermore, the grounded state and the ungrounded state of the sub wheel is changed by passenger's manipulation, and therefore the passenger is likely to be unsuccessful in performing a moving operation such as a turn intended by the passenger by erroneous manipulation.

The present invention has been made in view of the above background. Therefore, it is an object of the present invention to provide an omnidirectional vehicle which is stable in the traction of sub wheels.

SUMMARY OF THE INVENTION

In order to accomplish the above object, the present invention provides an omnidirectional vehicle, including: a main wheel able to be driven in all directions; a vehicle body frame which supports the main wheel; and a sub wheel which is connected to the vehicle body frame via an arm member and is grounded at a position apart from the ground contact point of the main wheel, wherein the sub wheel is attached so as to circularly move about the center of rotation of the main wheel.

According to the present invention, the sub wheel is attached so as to circularly move about the center of rotation of the main wheel. Therefore, even if the vehicle body frame, which supports the main wheel, inclines, a pressing force of the sub wheel to the ground does not change. This enables reduction in change in traction of the sub wheel, thereby stabilizing the traction of the sub wheel.

In the present invention, preferably the main wheel is supported by the vehicle body frame via a shaft member; and the arm member is attached to the shaft member so as to circularly move.

In this case, a friction (friction resistance) caused by the circular motion of the arm member is able to be reduced and thus the arm member reliably follows the inclination change of the vehicle body frame, thereby stabilizing the traction of the sub wheel.

Furthermore, in the present invention, preferably a cover member which covers the outside of the main wheel is provided, the arm member has a bifurcated shape, both tip portions of the bifurcated portion are located in such a way that the main wheel is placed between the tip portions, and the bifurcated-shaped branching portion is arranged inside the cover member.

In this case, the outside of the main wheel and the like is covered by the cover member, thereby preventing foreign substances such as sand from entering the cover from the outside. In addition, the bifurcated-shaped branching portion is arranged inside the cover member, and therefore a notch into which the arm member is to be inserted may be formed only at one place in the cover member. Thereby, it is possible to prevent foreign substances from getting mixed in the main wheel or the like from the notch, in comparison with the case where the bifurcated-shaped branching portion is arranged in the outside of the cover member.

In the present invention, the vehicle body frame inclines from the upright state with respect to the floor surface toward the ground contact point side of the sub wheel more stably than the case where the vehicle body frame inclines from the upright state with respect to the floor surface toward the opposite side to the ground contact point of the sub wheel.

Therefore, in the present invention, preferably two stoppers which regulate the circular motion of the arm member are provided so that the maximum angle at which the vehicle body frame is able to incline from the upright state with respect to the floor surface toward the opposite side to the ground contact point of the sub wheel is smaller than the maximum angle at which the vehicle body frame is able to incline from the upright state with respect to the floor surface toward the ground contact point side of the sub wheel.

DESCRIPTION OF THE PREFERRED EMBODIMENTS

One embodiment of the present invention will be described below with reference to FIGS. 1 to 5.

Figure 1:
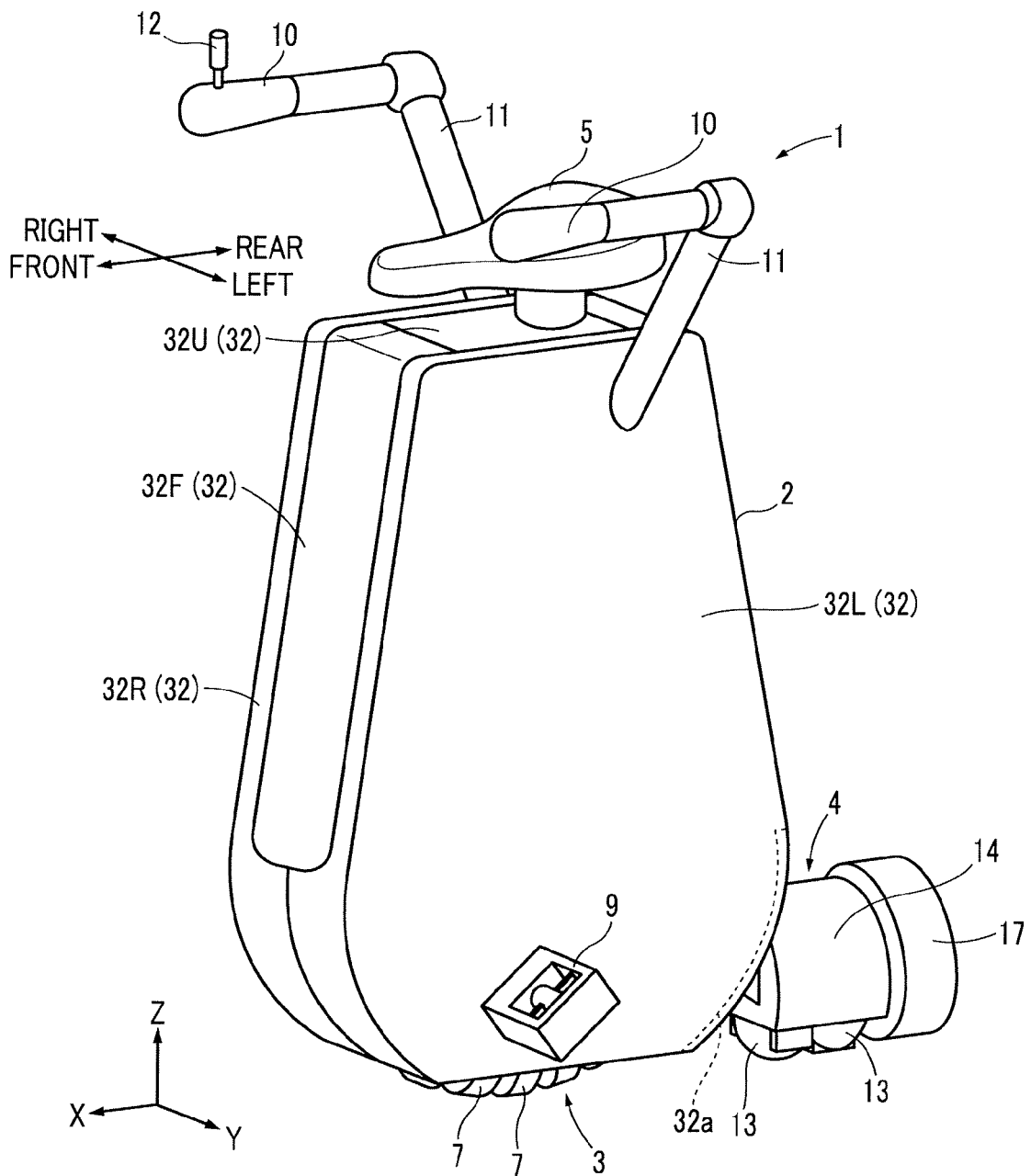
FIG. 1 is an appearance perspective view of an omnidirectional vehicle according to one embodiment of the present invention.
Figure 2:
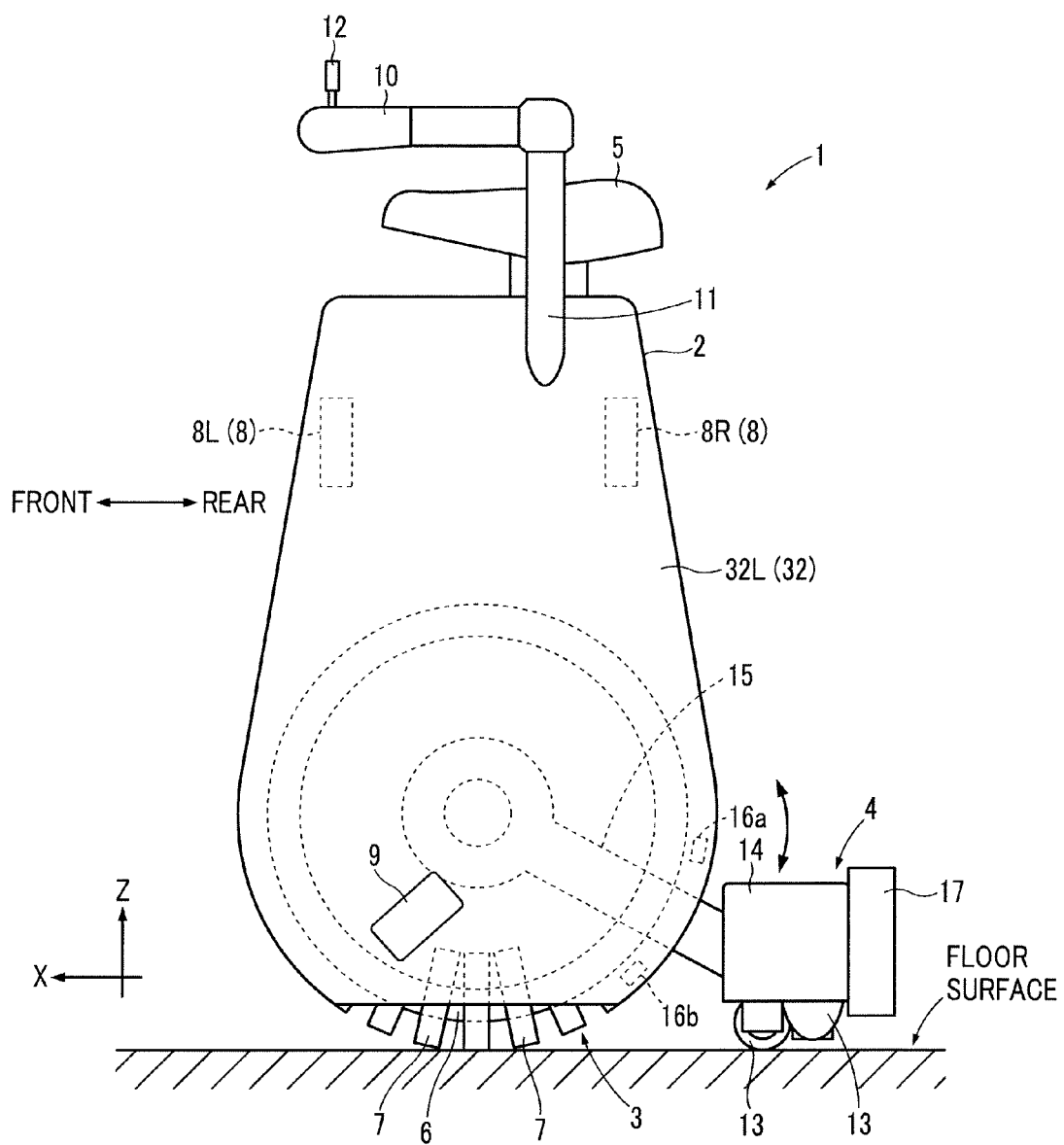
FIG. 2 is a side view of the omnidirectional vehicle according to the embodiment.

As illustrated in FIGS. 1 and 2, an omnidirectional vehicle 1 (hereinafter, simply referred to as "vehicle 1" in some cases) of this embodiment includes a base 2, a first moving operation unit 3 and a second moving operation unit 4 movable on a floor surface, and a passenger-riding portion 5 which a passenger rides.

The first moving operation unit 3 includes an annular core 6 (hereinafter, referred to as "circular core 6") illustrated in FIG. 2 and a plurality of annular rollers 7 mounted on the circular core 6 so as to be arranged at equal angular intervals in the circumferential direction (the direction about the central axis) of the circular core 6. Each roller 7 is externally inserted into the circular core 6 with its central axis of rotation oriented in the circumferential direction of the circular core 6. Then, each roller 7 is integrally rotatable with the circular core 6 about the central axis of the circular core 6 and rotatable about the central axis (a circumferential axis with the central axis of the circular core 6 as the center) of the cross section of the circular core 6.

A first moving operation unit 3 having the circular core 6 and the plurality of rollers 7 is grounded on the floor surface via the rollers 7 (the rollers 7 located in the lower part of the circular core 6) with the central axis of the circular core 6 oriented in parallel with the floor surface.

The circular core 6 is rotationally driven about the central axis thereof in the grounded state, by which the circular core 6 and the rollers 7 entirely wheel, thereby causing the first moving operation unit 3 to move on the floor surface in a direction crossing perpendicularly to the central axis of the circular core 6. In addition, each roller 7 is rotationally driven about the central axis of rotation thereof in the above grounded state, thereby causing the first moving operation unit 3 to move in the central axis direction of the circular core 6.

Furthermore, the rotational drive of the circular core 6 and that of each roller 7 cause the first moving operation unit 3 to move in a direction inclined with respect to the direction crossing perpendicularly to the central axis of the circular core 6 and with respect to the central axis direction of the circular core 6.

This enables the first moving operation unit 3 to move in all directions on the floor surface. In the following description, as illustrated in FIGS. 1 and 2, the X-axis direction is defined as a direction crossing perpendicularly to the central axis of the circular core 6, the Y-axis direction is defined as a central axis direction of the circular core 6, and the Z-axis direction is defined as a vertical direction among the moving directions of the first moving operation unit 3.

The first moving operation unit 3 is fastened to the base 2. More specifically, the base 2 is provided so as to cover the surrounding area of a portion of the first moving operation unit 3 other than the lower part thereof grounded on the floor surface. In addition, the circular core 6 of the first moving operation unit 3 is supported by the base 2 so as to freely rotate about the central axis. In this case, the base 2 is adapted to freely incline about the central axis of the circular core 6 of the first moving operation unit 3 (about the Y axis) with the central axis of the circular core 6 as a fulcrum. In addition, the base 2 inclines with the first moving operation unit 3 relative to the floor surface, by which the base 2 freely inclines about the X axis perpendicular to the central axis of the circular core 6 with the grounded portion of the first moving operation unit 3 as a fulcrum. Therefore, the base 2 is adapted to freely incline about two axes with respect to the vertical direction.

Furthermore, as illustrated in FIG. 2, the base 2 is equipped inside with a first actuator device 8 which generates a driving force for moving the first moving operation unit 3. The first actuator device 8 includes two electric motors 8R and 8L. Then, the electric motors 8R and 8L are adapted to give a rotational driving force to the first moving operation unit 3 via power transmission systems described later. The power transmission systems may each have a well-known structure.

In addition, the first moving operation unit 3 may have a structure different from the above structure. For example, as the structure of the first moving operation unit 3 and the structure of a drive system thereof, the structure proposed by the applicant of the present application in PCT International Publication No. WO 2008/132778 or PCT International Publication No. WO 2008/132779 may be employed.

Moreover, a passenger-riding portion 5 is fastened to the base 2. The passenger-riding portion 5 is composed of a seat on which the passenger sits and is fixed to the upper end portion of the base 2. In addition, the passenger is able to sit on the passenger-riding portion 5 with the anteroposterior direction oriented in the X-axis direction and with the horizontal direction oriented in the Y-axis direction. Furthermore, the passenger-riding portion 5 (seat) is fixed to the base 2 and therefore freely inclines with respect to the vertical direction integrally with the base 2.

Furthermore, a pair of footrests 9 and 9 on which the passenger sitting on the passenger-riding portion 5 places his/her feet and a pair of grippers 10 and 10 gripped by the passenger are fastened to the base 2.

The footrests 9 and 9 are provided in a protruding manner at the lower parts of both sides of the base 2. In FIG. 1 and FIG. 2, the footrest 9 on one side (the right side) is not illustrated.

Furthermore, the grippers 10 and 10 are each bar-shaped in such a way as to be arranged being extended in the X-axis direction (the anteroposterior direction) on both sides of the passenger-riding portion 5. The grippers 10 and 10 are each fixed to the base 2 via a rod 11 provided in an extended manner from the base 2. In addition, a joystick 12 as a manipulator is attached to one gripper 10 (the gripper 10 on the right side in the diagram) of the grippers 10 and 10.

The joystick 12 is adapted to be swingable in the anteroposterior direction (X-axis direction) and the horizontal direction (Y-axis direction). Then, the joystick 12 outputs a manipulate signal indicating the amount of swing in the anteroposterior direction (X-axis direction) and the direction of the swing (forward or backward) as an advance/reverse command for moving the vehicle 1 forward or backward and outputs a manipulate signal indicating the amount of swing in the horizontal direction (Y-axis direction) and the direction of the swing (rightward or leftward) as a turn command for turning the vehicle 1 right-handed (clockwise) or left-handed (counterclockwise).

The second moving operation unit 4 is composed of a so-called omni-wheel in this embodiment. The omni-wheel as the second moving operation unit 4 has a well-known structure which includes a pair of circular cores (not illustrated) coaxial with each other and a plurality of barrel-shaped rollers 13 having the central axis of rotation externally inserted into the circular cores in the circumferential direction thereof so as to freely rotate.

In this case, the second moving operation unit 4 is arranged at the back of the first moving operation unit 3 with the central axis of the pair of circular cores oriented in the X-axis direction (the anteroposterior direction) and is grounded on the floor surface via the rollers 13.

In addition, the roller 13 on one side of the pair of circular cores and the roller 13 on the other side are arranged with a phase deviated in the circumferential direction of the circular core. During the rotation of the pair of circular cores, one of the roller 13 on one side of the pair of circular cores and the roller 13 on the other side is adapted to be grounded on the floor surface.

The second moving operation unit 4 composed of the aforementioned omni-wheel is coupled to the base 2. More specifically, in the second moving operation unit 4, the omni-wheel (the whole of the pair of circular cores and the plurality of rollers 13) is coupled to an arm 15 which is an arm member provided in an extended manner from the base 2 side.

Then, the arm 15 is supported by the base 2 so as to swing about the central axis of the circular core 6 of the first moving operation unit 3. The upper part of the omni-wheel is covered by the case 14 and the case 14 is attached to the arm 15. Thereby, the second moving operation unit 4 is coupled to the base 2 via the arm 15.

The second moving operation unit 4 may include a case which covers the upper part of the omni-wheel, the circular core of the omni-wheel may be supported so as to freely rotate about the central axis, and the arm provided in the extended manner from the case to the base 2 side may be supported by the base 2 so as to swing about the central axis of the circular core 6 of the first moving operation unit 3.

Furthermore, the second moving operation unit 4 freely swings with respect to the base 2 about the central axis of the circular core 6 of the first moving operation unit 3 by the swing of the arm 15. This enables the passenger-riding portion 5 to incline about the Y axis along with the base 2 with both of the first moving operation unit 3 and the second moving operation unit 4 grounded.

More specifically, the arm 15 is coaxially coupled to the central axis portion of the circular core 6 of the first moving operation unit 3 via a large-diameter bearing, by which the second moving operation unit 4 is coupled to the first moving operation unit 3 via the arm 15.

In addition, the base 2 is equipped with a pair of stoppers 16a and 16b which limit the swing range of the arm 15, and the arm 15 is able to swing within the range of the stoppers 16a and 16b. This limits the swing range of the second moving operation unit 4 about the central axis of the circular core 6 of the first moving operation unit 3 and consequently the range of inclination about the Y axis of the base 2 and the passenger-riding portion 5, thereby preventing the base 2 and the passenger-riding portion 5 from excessively inclining forward or backward of the passenger.

In addition, the second moving operation unit 4 is able to be biased so as to be pressed against the floor surface by using a spring.

As described above, the second moving operation unit 4 is able to move on the floor surface in all directions including the X-axis direction and the Y-axis direction, similarly to the first moving operation unit 3, by performing one or both of the rotation of the pair of circular cores and the rotation of the rollers 13. More specifically, the rotation of the circular cores enables the second moving operation unit 4 to move in the Y-axis direction (the horizontal direction), and the rotation of the rollers 13 enables the second moving operation unit 4 to move in the X-axis direction (the anteroposterior direction).

Moreover, an electric motor 17 as a second actuator device which drives the second moving operation unit 4 is attached to the case 14 of the second moving operation unit 4. The electric motor 17 is coupled to the pair of circular cores so as to rotationally drive the pair of circular cores of the second moving operation unit 4.

Therefore, in this embodiment, the second moving operation unit 4 moves in the X-axis direction in a driven manner so as to follow the movement of the first moving operation unit 3 in the X-axis direction, and the second moving operation unit 4 moves in the Y-axis direction by the electric motor 17 rotationally driving the pair of circular cores of the second moving operation unit 4.

Supplementally, the second moving operation unit 4 may have the same structure as the first moving operation unit 3.

The above is the mechanical configuration of the vehicle 1 in this embodiment.

Figure 3:
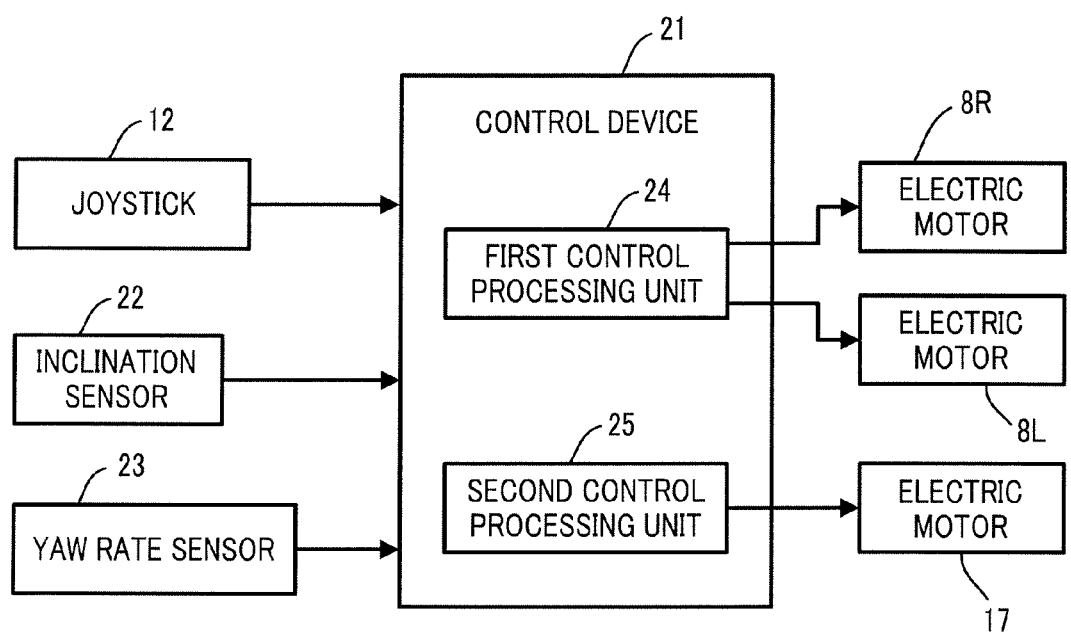
FIG. 3 is a block diagram illustrating a configuration for controlling the omnidirectional vehicle of the embodiment.

Although not illustrated in FIG. 1 and FIG. 2, the base 2 of the vehicle 1 according to this embodiment is equipped with a control device 21, which is composed of an electronic circuit unit including a CPU, RAM, ROM, and the like, an inclination sensor 22 for use in measuring the inclination angle of the passenger-riding portion 5 (an inclination angle of the base 2) with respect to the vertical direction, and a yaw rate sensor 23 for use in measuring the angular velocity about the yaw axis of the vehicle 1, as illustrated in FIG. 3, as a configuration for the operation control of the vehicle 1 (the operation control of the first moving operation unit 3 and the second moving operation unit 4).

Then, the control device 21 is adapted to receive outputs from the joystick 12 and detection signals from the inclination sensor 22 and the yaw rate sensor 23.

The aforementioned inclination sensor 22 is composed of, for example, an acceleration sensor and an angular velocity sensor such as a gyro sensor. Then, the control device 21 acquires the measured value of the inclination angle of the passenger-riding portion 5 (in other words, the inclination angle of the base 2) from the detection signals received from the acceleration sensor and the angular velocity sensor by using a well-known method.

The inclination angle of the passenger-riding portion 5 (or the inclination angle of the base 2) in this embodiment is, more specifically, an inclination angle (a pair of an inclination angle in a direction about the X axis and an inclination angle in a direction about the Y axis), with the posture of the passenger-riding portion 5 (or the base 2) as a reference (zero) in a state where the overall center of gravity including the weight of the vehicle 1 and the weight of the passenger riding the passenger-riding portion 5 in a predetermined posture (standard posture) is located directly above (above in the vertical direction) the grounded portion of the first moving operation unit 3.

Moreover, the yaw rate sensor 23 is composed of an angular velocity sensor such as a gyro sensor. Further, the control device 21 acquires a measured value of an angular velocity about the yaw axis of the vehicle 1 on the basis of the detection signal of the angular velocity sensor.

Furthermore, as functions implemented by using the installed programs or the like, the control device 21 has a function of acquiring the measured value as described above, and further has a first control processing unit 24 which controls the moving operation of the first moving operation unit 3 by controlling electric motors 8a and 8b constituting the first actuator device 8 and a second control processing unit 25 which controls the moving operation of the second moving operation unit 4 by controlling the electric motor 17 as the second actuator device. The first control processing unit 24 and the second control processing unit 25 correspond to a first control means and a second control means in the present invention, respectively.

The first control processing unit 24 performs arithmetic processing described later to sequentially calculate a first target speed, which is a target value of the moving speed of the first moving operation unit 3 (more specifically, a pair of the translational velocity in the X-axis direction and a translational velocity in the Y-axis direction) and controls the rotational speed of the electric motors 8R and 8L so that the actual moving speed of the first moving operation unit 3 coincides with the first target speed.

In this case, the relationship between the respective rotational speeds of the electric motors 8R and 8L and the actual moving speed of the first moving operation unit 3 is previously determined, and the target values of the rotational speeds of the electric motors 8R and 8L are defined according to the first target speed of the first moving operation unit 3. Then, the rotational speeds of the electric motors 8R and 8L are feedback-controlled to the target values defined according to the first target speed, by which the actual moving speed of the first moving operation unit 3 is controlled to the first target speed.

Moreover, the second control processing unit 25 performs arithmetic processing described later to sequentially calculate a second target speed, which is a target value of the moving speed of the second moving operation unit 4 (more specifically, a translational velocity in the Y-axis direction) and controls the rotational speed of the electric motor 17 so that the actual moving speed of the second moving operation unit 4 in the Y-axis direction coincides with the second target speed.

In this case, similarly to the first moving operation unit 3, the relationship between the rotational speed of the electric motor 17 and the actual moving speed of the second moving operation unit 4 in the Y-axis direction is previously determined, and the target value of the rotational speed of the electric motor 17 is defined according to the second target speed of the second moving operation unit 4. In addition, the rotational speed of the electric motor 17 is feedback-controlled to the target value defined according to the second target speed, by which the actual moving speed of the second moving operation unit 4 in the Y-axis direction is controlled to the second target speed.

Supplementally, in this embodiment, the second moving operation unit 4 moves in the X-axis direction in a driven manner so as to follow the movement of the first moving operation unit 3 in the X-axis direction. Therefore, it is unnecessary to set the target value of the moving speed of the second moving operation unit 4 in the X-axis direction.

Subsequently, the configuration of the vehicle 1 will be described in more detail.

(Configuration of Base)

Figure 4:
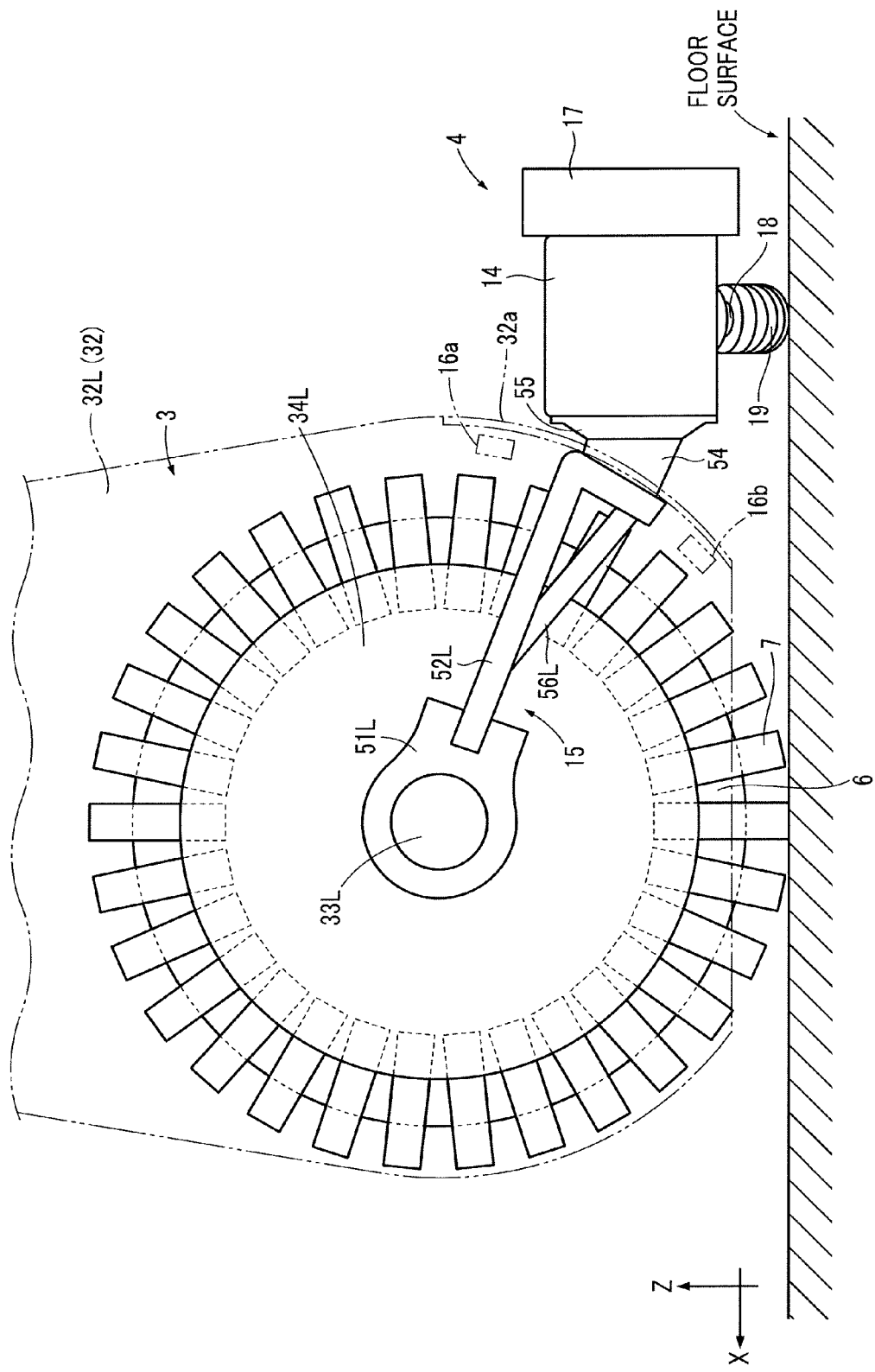
FIG. 4 is a partial side view of the omnidirectional vehicle in which a cover is indicated by a virtual line.
Figure 5:
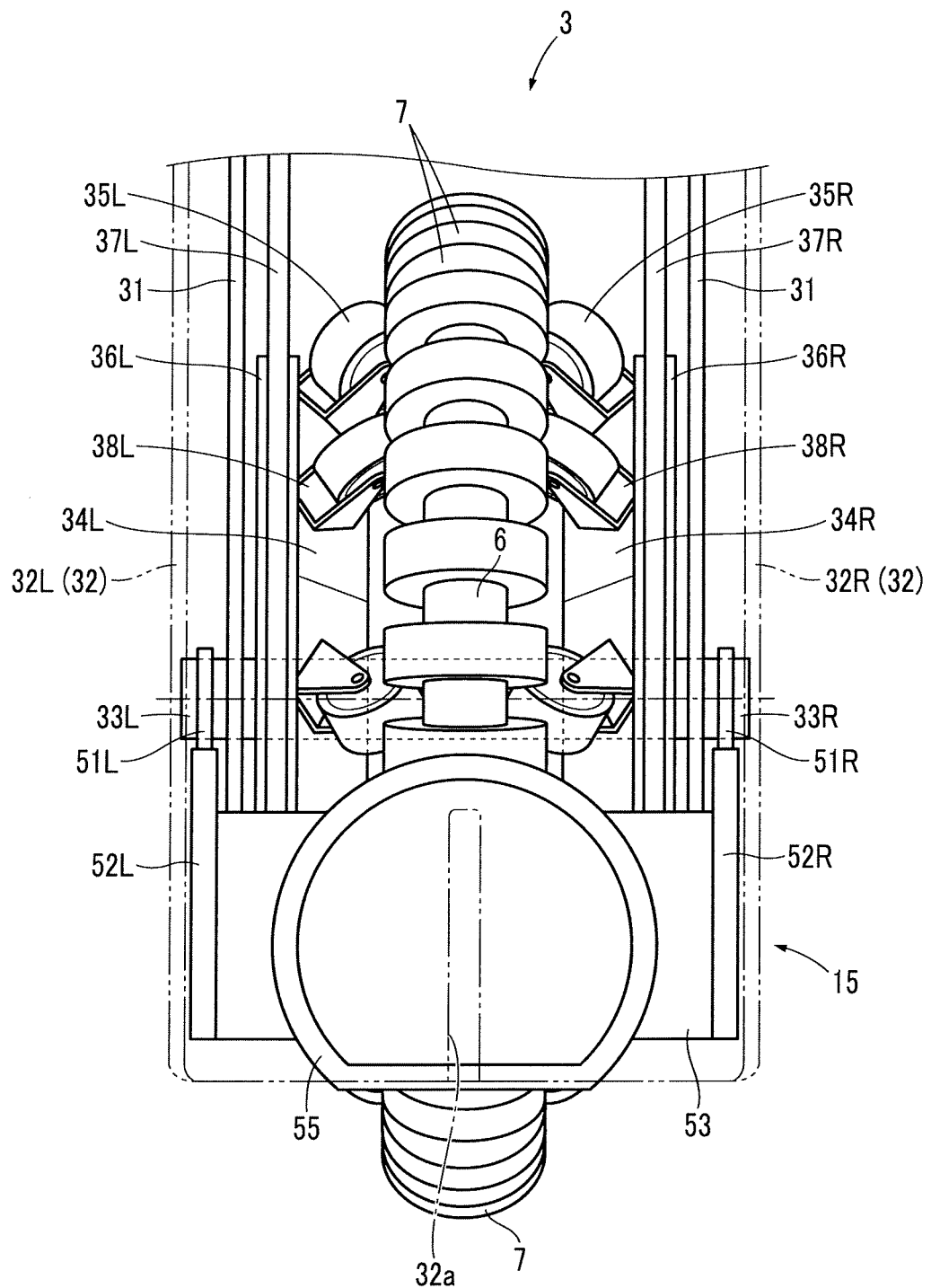
FIG. 5 is a partial rear view of the omnidirectional vehicle in which a sub wheel 4 is removed and the cover is indicated by a virtual line.

As illustrated in FIGS. 4 and 5, the base 2 includes a vehicle body frame 31 as a framework structure and a cover 32 which is a cover member covering the outside of the vehicle body frame 31. The vehicle body frame 31 is formed of metal such as aluminum, and the cover 32 is formed of plastic such as carbon fiber reinforced plastic (CFRP). The cover 32 covers the outside of the first moving operation unit 3 (hereinafter, referred to as "main wheel 3") to prevent foreign substances such as sand from entering the cover 32 from the outside and getting mixed in the main wheel 3 or the like.

Support shafts 33R and 33L, which are shaft members, are fixed to the vehicle body frame 31 and the circular core 6 is supported so as to freely rotate by the support shafts 33R and 33L. Furthermore, although details are not illustrated, the passenger-riding portion 5, the first actuator device 8, the pair of footrests 9 and 9, the rod 11 and the like are fixed to the vehicle body frame 31.

The cover 32 has a hollow outer shell structure and has an opening (not illustrated) at the bottom thereof. A grounded portion of the main wheel 3 is exposed from the opening. In this embodiment, the cover 32 includes five covers: a left cover 32L, a right cover 32R, a front cover 32F, a back cover 32B (not illustrated), and an upper cover 32U. The covers are latched to each other by a latch mechanism such as a click and a concave portion or fixed to each other by a fixture such as a screw. In addition, at least one of the five covers is fixed to the vehicle body frame 31 by a fixture such as a screw.

Furthermore, the cover 32 has openings (not illustrated) formed so as to correspond to the passenger-riding portion 5, the pair of footrests 9 and 9, the rod 11, which are located in such a way as to project outward of the cover 32.

(Configuration of Actuator Device)

The main wheel 3 illustrated in this embodiment and the first actuator device 8 which gives motive power to the main wheel 3 have the same structures as, for example, the structures disclosed in FIG. 11 of International Publication No. WO 2008/139740. Therefore, in the description of this embodiment, regarding the configuration of the main wheel 3 and that of the first actuator device 8, only a simple description is made with respect to the matters described in International Publication No. WO 2008/139740.

The first actuator device 8 includes rotating members 34R and 34L located on the right side and the left side of the main wheel 3, respectively, and a plurality of free rollers 35R and 35L attached to the rotating members 34R and 34L, respectively, so as to freely rotate.

The respective housings of the electric motors 8R and 8L are attached to the vehicle body frame 31. Although not illustrated, the power supplies (capacitors) of the electric motors 8R and 8L are loaded in the vehicle body frame 31 in place.

The right-hand rotating member 34R and the left-hand rotating member 34L are rotatably supported by the aforementioned support shaft 33R and the aforementioned support shaft 33L, respectively. Thereby, the right and left rotating members 34R and 34L are rotatably supported by the vehicle body frame 31 at predetermined intervals in the axial line direction (intervals in the horizontal direction) coaxially and independently of each other.

The rotating members 34R and 34L are connected to the output shafts of the electric motors 8R and 8L, respectively, via power transmission systems each including a function as a speed reducer, and are rotationally driven by motive power (torque) transmitted from the electric motors 8R and 8L. Each power transmission system is of, for example, a pulley-belt type. Specifically, as illustrated in FIG. 5, regarding the rotating member 34R, a pulley 36R formed integrally with the rotating member 34R is connected to the output shaft of the electric motor 8R via a belt 37R. Similarly, regarding the rotating member 34L, a pulley 36L formed integrally with the rotating member 34L is connected to the output shaft of the electric motor 8L via a belt 37L.

The aforementioned power transmission system may be composed of, for example, a sprocket and a link chain or composed of a plurality of gears. In addition, for example, the electric motors 8R and 8L may be arranged to face the rotating members 34R and 34L so that the output shafts of the electric motors 8R and 8L are coaxial with the rotating members 34R and 34L, respectively, and the output shafts of the electric motors 8R and 8L may be coupled to the rotating members 34R and 34L via speed reducers (planetary gear units or the like), respectively.

The rotating members 34R and 34L are formed in the same shape as a circular truncated cone which has a diameter reduced toward the main wheel 3 and each have a tapered outer peripheral surface.

A plurality of free rollers 35R are arrayed so as to be arranged at regular intervals on the circumference of a circle concentric with the rotating member 34R around the tapered outer peripheral surface of the rotating member 34R. In addition, these free rollers 35R are attached to the tapered outer peripheral surface via a bracket 38R and supported by the bracket 38R so as to freely rotate.

Similarly, a plurality of (the same number as the number of free rollers 35R) free rollers 35L are arrayed so as to be arranged at regular intervals on the circumference of a circle concentric with the rotating member 34L around the tapered outer peripheral surface of the rotating member 34L. In addition, these free rollers 35L are attached to the tapered outer peripheral surface via a bracket 38L and supported by the bracket 38L so as to freely rotate.

The main wheel 3 is coaxially arranged with the rotating members 34R and 34L in such a way as to be placed between the free roller 35R on the rotating member 34R side and the free roller 35L on the rotating member 34L side.

In this case, as illustrated in FIG. 5, the free rollers 35R and 35L are arranged in postures where the central axes of the free rollers 35R and 35L are inclined with respect to the central axis of the main wheel 3 and inclined with respect to the diametrical direction of the main wheel 3 (when the circular core 6 is viewed in the direction of the central axis thereof, the radial direction between the central axis and each of the free rollers 35R and 35L). Furthermore, in the above postures, the outer peripheral surfaces of the free rollers 35R and 35L are in pressure contact with the outer peripheral surface of the roller (sleeve) 7 in an oblique direction.

Moreover, the roller 7 rotates about the circular core 6 (about the center line of the cross section) due to a contact with the free rollers 35R and 35L which rotationally move along with the rotating members 34R and 34L, thereby enabling the driving force in the horizontal direction to be applied to the ground contact surface. Furthermore, along with this, the movement of the roller 7 in the circumferential direction caused by the rotation of the entire main wheel 3 enables the driving force in the anteroposterior direction to be applied to the ground contact surface.

(Configuration of Sub Wheel and Arm)

As described above, the second moving operation unit 4 may be composed of a so-called omni-wheel which includes a pair of coaxial circular cores (not illustrated) and a plurality of barrel-shaped rollers 13 externally inserted into the respective circular cores so as to freely rotate with the central axis of rotation oriented in the direction of the circumference of the circular cores.

In this specification, however, description is made for a case where the second moving operation unit 4 (hereinafter, referred to as "sub wheel 4") is composed of a so-called omni-wheel which includes one circular core 18 and a plurality of barrel-shaped rollers 19 externally inserted into the circular core 18 so as to freely rotate with the central axis of rotation oriented in the direction of the circumference of the circular core 18.

The sub wheel 4 is arranged in the rear of the main wheel 3 with the central axis of the circular core 18 oriented in the X-axis direction (the anteroposterior direction) and is grounded on the floor surface via the roller 19. Thereby, the sub wheel 4 is grounded at a position backward apart from the ground contact point of the main wheel 3.

The sub wheel 4 is coupled to the rear end of the arm 15 which is an arm member provided in an extended manner from the base 2 side. More specifically, the omni-wheel (the whole of the circular core 18 and the plurality of rollers 19) is coupled to the arm 15 and the case 14, which covers the upper-side portion of the omni-wheel, is fixed to the arm 15 by a fixture (not illustrated) such as a screw. In addition, the electric motor 17 which drives the sub wheel 4 is attached to the case 14.

The electric motor 17 is coupled to the circular core 18 so as to rotationally drive the circular core 18. For example, the configuration may be made such that the output shaft of the electric motor 17 is coupled to the central axis of the circular core 18 and the central axis is supported, via a cylindrical bearing, inside the tubular member which constitutes the vehicle body frame in the inside of the case 14. Alternatively, for example, the configuration may be made such that the output shaft of the electric motor 17 is coupled to a common central axis of the circular core 18 and the tip convex portion of the central axis is supported by a concave portion of the pivot bearing fixed to the case 14.

The arm 15 is attached to the vehicle body frame 31 so as to circularly move about the center of rotation of the main wheel 3, in other words, about the central axis of the circular core 6. This enables reduction in change in traction of the sub wheel 4 caused by an inclination of the base 2 which supports the main wheel 3, thereby stabilizing the traction of the sub wheel 4. The arm 15 may be pivotally supported by the central axis portion of the circular core 6 of the main wheel 3.

In addition, the central axis portion of the circular core 6 of the first moving operation unit 3 is attached to the shaft member (not illustrated) and the arm 15 is attached to the shaft member, by which the second moving operation unit 4 is coupled to the first moving operation unit 3 via the arm 15. In this manner, the attachment with the shaft member enables a reduction in the influence of friction.

The main wheel 3 is supported by the base 2 via the support shafts 33R and 33L, and the arm 15 is attached to the support shafts 33R and 33L so as to circularly move. This enables reduction in friction (friction resistance) caused by the circular motion of the arm 15, by which the arm 15 reliably follows inclination changes of the base 2, which stabilizes the traction of the sub wheel 4.

The arm 15 has a bifurcated shape on the main wheel 3 side and is attached to the right and left support shafts 33R and 33L so as to circularly move. More specifically, the arm 15 includes: rotary strips 51R and 51L which are attached to the right and left support shafts 33R and 33L, respectively, so as to circularly move; pipe members 52R and 52L which are fixed to the rotary strips 51R and 51L, respectively, by welding or the like and extend backward; a connecting strip 53 with the right and left ends to which the rear ends of the pipe members 52R and 52L are fixed by welding or the like; a backward-extended strip 54, which extends backward with a narrow horizontal width, being fixed to the center on the rear side of the connecting strip 53 by welding or the like; and a connecting portion 55 which is connected to the rear end of the backward-extended strip 54 by welding or the like with the case 14 fixed by a fixture (not illustrated) such as a screw. Furthermore, reinforcing members 56R and 56L made of pipe material reinforce the pipe members 52R and 52L.

In addition, the backward-extended strip 54 is adapted to be inserted into a notch 32a of the cover 32, and the rotary strips 51R and 51L, the pipe members 52R and 52L, and the connecting strip 53 are housed in the cover 32, and the connecting portion 55 is arranged outside the cover. The notch 32a communicates with the aforementioned opening (not illustrated) at the bottom of the cover 32 and is formed between the left cover 32L and the right cover 32R.

The coupling portion between the connecting strip 53, which is a bifurcated branching portion of the arm 15, and the backward-extended strip 54 is arranged in the inside of the cover 32. Therefore, it is only necessary to form the notch 32a into which the arm 15 is inserted at one place in the cover 32. Therefore, in comparison with the case where the bifurcated-shaped branching portion of the arm 15 is arranged outside the cover 32, foreign substances is able to be prevented from entering the cover 32 from the notch 32a.

Furthermore, the coupling portion between the connecting strip 53 which is the bifurcated branching portion of the arm 15 and the backward-extended strip 54 is arranged lower than the straight line between the center of rotation of the main wheel 3 and the center of rotation of the sub wheel 4. This enables a reduction in the length of the notch 32a into which the arm 15 is inserted, thereby increasing the advantageous effect of preventing foreign substances from entering the cover 32 from the notch 32a.

In the inside of the left cover 32L or the right cover 32R, there are provided a stopper 16b which limits the forward inclination of the base 2 and a stopper 16a which limits the backward inclination of the base 2. Thereby, the arm 15 is able to swing within a range where the arm 15 does not come in contact with the stoppers 16a and 16b.

The sub wheel 4 is grounded at a position backward apart from the ground contact point of the main wheel 3 and therefore the backward inclination of the vehicle 1 is superior in terms of stability to the forward inclination of the vehicle 1. Accordingly, preferably the positions of the stoppers 16a and 16b are set so that the maximum angle at which the vehicle body frame 31, namely the base 2 is able to incline from the upright state with respect to the floor surface toward the opposite side to the ground contact point of the sub wheel 4, in other words, forward is smaller than the maximum angle at which the base 2 is able to incline from the upright state with respect to the floor surface toward the ground contact point side of the sub wheel 4, namely backward.

What is claimed is:

1. An omnidirectional vehicle comprising:
   a main wheel able to be driven in all directions;
   a vehicle body frame which supports the main wheel; and
   a sub wheel which is connected to the vehicle body frame via an arm member and is grounded at a position apart from the ground contact point of the main wheel,
   wherein the sub wheel is attached so as to circularly move about the center of rotation of the main wheel,
   the main wheel is supported by the vehicle body frame via a shaft member; and
   the arm member is attached to the shaft member so as to circularly move.

2. The omnidirectional vehicle according to claim 1, wherein a cover member which covers the outside of the main wheel is provided, the arm member has a bifurcated shape, both tip portions of the bifurcated portion are located in such a way that the main wheel is placed between the tip portions, and the bifurcated-shaped branching portion is arranged inside the cover member.

3. The omnidirectional vehicle according to claim 1, wherein two stoppers which regulate the circular motion of the arm member are provided so that the maximum angle at which the vehicle body frame is able to incline from the upright state with respect to the floor surface toward the opposite side to the ground contact point of the sub wheel is smaller than the maximum angle at which the vehicle body frame is able to incline from the upright state with respect to the floor surface toward the ground contact point side of the sub wheel.

4. The omnidirectional vehicle according to claim 2, wherein two stoppers which regulate the circular motion of the arm member are provided so that the maximum angle at which the vehicle body frame is able to incline from the upright state with respect to the floor surface toward the opposite side to the ground contact point of the sub wheel is smaller than the maximum angle at which the vehicle body frame is able to incline from the upright state with respect to the floor surface toward the ground contact point side of the sub wheel.

* * * * *